United States Patent [19]
Thiel et al.

[11] Patent Number: 5,158,159
[45] Date of Patent: Oct. 27, 1992

[54] SPOT-TYPE DISC BRAKE, IN PARTICULAR FOR AUTOMOTIVE VEHICLES

[75] Inventors: Rudolf Thiel, Frankfurt am Main; Ulrich Klimt, Muehltal, both of Fed. Rep. of Germany

[73] Assignee: Alfred Teves GmbH, Frankfurt am Main, Fed. Rep. of Germany

[21] Appl. No.: 279,595

[22] PCT Filed: Sep. 13, 1986

[86] PCT No.: PCT/EP86/00528
§ 371 Date: Jan. 3, 1990
§ 102 (e) Date: Jan. 3, 1990

[87] PCT Pub. No.: WO87/03349
PCT Pub. Date: June 4, 1987

[30] Foreign Application Priority Data

Nov. 30, 1985 [DE] Fed. Rep. of Germany ....... 3542388

[51] Int. Cl.[5] .......................... B60T 1/06; F16D 65/14
[52] U.S. Cl. ................ 188/73.45; 188/73.47
[58] Field of Search ............... 188/73.44, 73.31, 73.34, 188/71.1, 73.1, 73.45, 73.47; 277/212 FB

[56] References Cited

U.S. PATENT DOCUMENTS

| | | | |
|---|---|---|---|
| Re. 31,794 | 1/1985 | Burgdorf et al. | 188/73.47 X |
| 4,360,079 | 11/1982 | Belart | 188/73.34 |
| 4,391,355 | 7/1983 | Evans | 188/73.44 |
| 4,463,837 | 8/1984 | Courbot | 188/73.44 X |
| 4,467,898 | 8/1984 | Courbot et al. | 188/73.44 |
| 4,480,724 | 11/1984 | Hoffman, Jr. | 188/73.44 X |
| 4,527,667 | 7/1985 | Courbot | 188/73.44 X |
| 4,570,760 | 2/1986 | Schmidt | 188/73.44 |
| 4,630,713 | 12/1986 | Carre et al. | 188/73.44 |

FOREIGN PATENT DOCUMENTS

| | | | |
|---|---|---|---|
| 0076202 | 4/1983 | European Pat. Off. | |
| 2251111 | 5/1973 | Fed. Rep. of Germany | |
| 2454279 | 9/1975 | Fed. Rep. of Germany | |
| 2713379 | 9/1977 | Fed. Rep. of Germany | |
| 2905833 | 9/1979 | Fed. Rep. of Germany | |
| 3430351 | 3/1985 | Fed. Rep. of Germany | |
| 2538487 | 6/1984 | France | 188/73.34 |
| 0119235 | 9/1980 | Japan | 188/73.44 |
| 1524007 | 9/1978 | United Kingdom | |
| 1545825 | 5/1979 | United Kingdom | |
| 2013801 | 8/1979 | United Kingdom | |

*Primary Examiner*—Robert J. Oberleitner
*Assistant Examiner*—Peter M. Poon
*Attorney, Agent, or Firm*—Robert P. Seitter; J. Gordon Lewis

[57] ABSTRACT

A spot-type disc brake in which a brake carrier elastically mounts a brake frame on a pair of guide rods so as to allow limited axial tilting. The brake carrier has a pair of axial arms receiving the brake pads therebetween and each attached to a radial member facing an inner connecting member connecting brake frame arms, and the guide rods extending axially therebetween. The brake frame arms straddle the carrier arms, and a spring element acts to press a contact area on one connecting portion of the carrier arms into engagement with central area on an outer connecting member fixed between the brake frame arms. A space between a pair of radially extending limbs of the brake carrier receives the actuating device mounted on another connecting member extending between the brake frame arms. Guide pins fixed to the brake carrier extend through oblong openings in the brake pads.

10 Claims, 2 Drawing Sheets

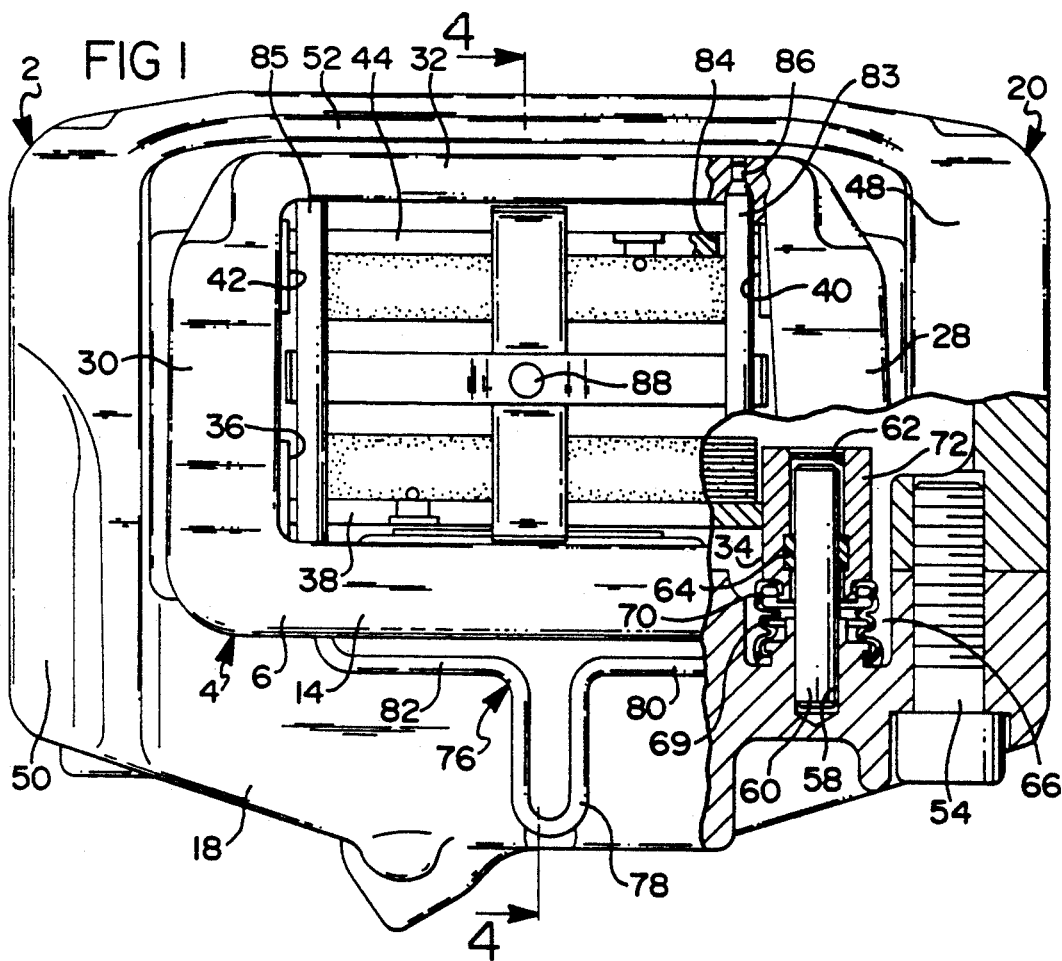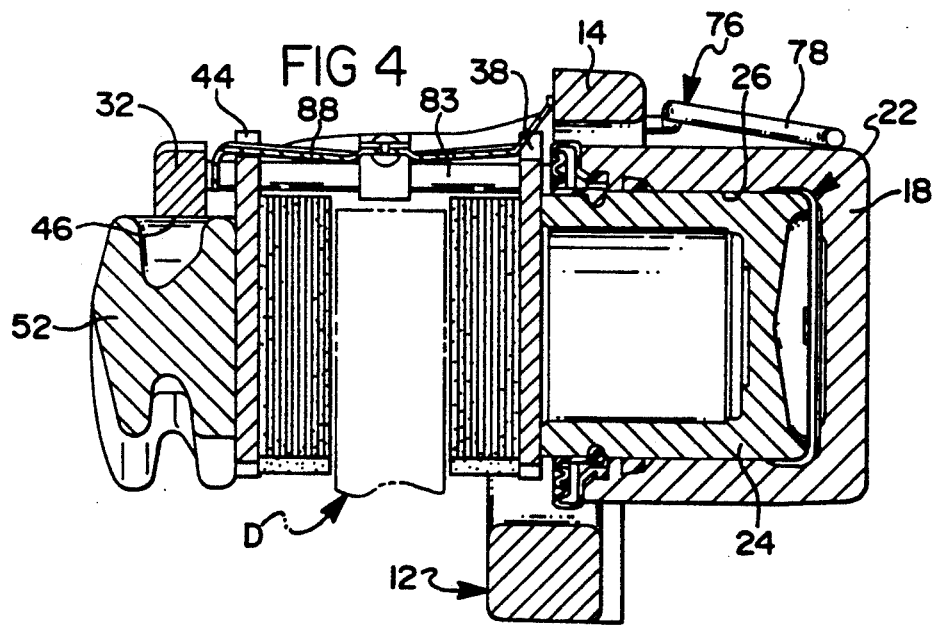

SPOT-TYPE DISC BRAKE, IN PARTICULAR FOR AUTOMOTIVE VEHICLES

BACKGROUND OF THE INVENTION

This invention relates to a spot-type disc brake, in particular for automotive vehicles.

In a known spot-type disc brake (British Patent Specification=GB-PS No. 1,545,825) brake caliper guide bolts are slidably received in guide bores to be mounted on the brake carrier. This known spot-type disc brake is disadvantageous in that, when manufacturing, the dimensions of the guide bolts and guide bores must be adhered to very accurately so as to prevent jamming of the guides. Further, in the known spot-type disc brake, uneven wear, a high residual braking torque after the release of the brake, and brake rubbing have occurred.

It is further known (German Printed and Examined Patent Application=DE-AS No. 28 04 808) to provide elastic guide sleeves in a spot-type disc brake in the guide bores of a brake caliper for guiding the brake caliper, which radially straddles the brake disc and the brake shoes from the outside, at two axially parallel guide bolts fixed at the brake carrier and to support the brake caliper at the outside edge of the carrier plate of the brake shoe on the brake disc's side away from the guide bolts. The brake caliper and the brake shoe are pressed against each other and against the brake carrier by means of a spring clip. In this known spot-type disc brake the brake shoes are relatively long in the circumferential direction of the brake disc and thus susceptible to uneven wear. A further disadvantage is that the brake caliper has to be removed from the brake carrier when exchanging the brake shoes.

It is an object of this invention to provide a spot-type disc brake of this type which has a simple design and which does not require accurate manufacturing tolerances for the guide arrangement.

SUMMARY OF THE INVENTION

According to this invention this object is solved by a guide system which enables a metal-clad, corrosion-free, rubber, elastic and symmetrical arrangement. Smooth round steel may be used for the guide bolts. Disadvantages of the prior art such as uneven wear, a high residual braking torque after the release of the brake and brake rubbing are eliminated by the inventive solution. The design being simple, the inventive solution in conjunction with the elastic bolt guidance ensures a yieldingness of the brake frame in radial and tangential directions. In particular, in case of corrosion, the brake frame may move and thus again free itself from corrosion. As for manufacture, it is possible to mostly use simple standard parts. The exchange of pads can be effected at the vehicle by simply removing the pads radially.

According to an advantageous embodiment of this invention, for the purpose of supporting a brake caliper in the shape of a frame on the brake disc's side away from the guide rods, one sole point of support is provided on a portion connecting the carrier arms, expediently designed in one piece with the arms. This point of support lies in the plane of the axis of the brake disc and the axis of symmetry of the brake carrier. In this respect it appears to be especially expedient for the brake frame to be supported with its radially outside surface at the radially inside surface of the brake carrier. This means that the spring device, on the opposite side, has to exert a radially inside acting force on the brake frame. In this arrangement the resulting structure is particularly simple and only requires very little treatment, beside the two guide rods an open stop being formed between the brake frame and the brake carrier, which open stop is formed as a third point of support. The point of abutment on the brake frame needs no treatment. For reasons of tolerance compensation, the point of abutment on the brake carrier expediently will be worked on along with he pad supporting surfaces provided on the brake carrier arms. Further advantageous embodiments of this invention provide that the spring device is arranged on the mounting side of the brake carrier. In this arrangement, the spring device in particular may be formed by one sole wire spring expediently provided with a U-shaped central portion for the support at the brake frame and with two arms proceeding from the central portion and at first essentially extending parallel to the brake disc and subsequently essentially extending parallel to the axis of rotation of the brake disc, the end portions of said arms being attachable to the brake carrier. By means of such a simple wire spring it is possible to clamp both parts with each other in a simple and favorable manner in terms of cost.

In a further preferred embodiment, it is provided that the brake carrier has a connecting portion on the mounting side, the connecting portion connecting two essentially radially extending brake carrier portions and, with the same, defining an opening, the brake frame arm which contains the actuation device partially extending into this opening. The spring device is advantageously mounted on this connecting portion.

Due to a two piece construction of the brake frame as provided by another advantageous feature of this invention, a welded, screwed or caulked cover locking the bore of the actuation device becomes unnecessary, and thus further expensive manufacturing operations an avoided.

DESCRIPTION OF THE DRAWING FIGURES

In the drawing,

FIG. 1 is a plan view in partial section of a spot-type disc brake according to the invention;

FIG. 4 is the section along 4—4 in FIG. 1 of the spot-type disc brake represented in FIGS. 1-3.

DETAILED DESCRIPTION

Figure 2:
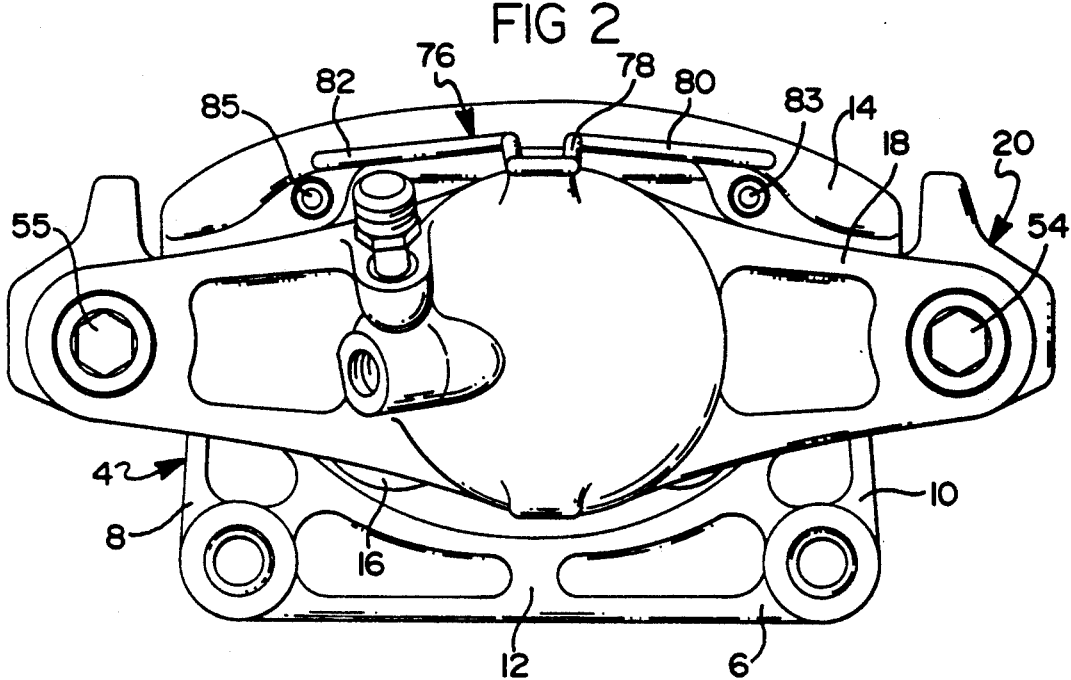
FIG. 2 is an end view of the spot-type disc brake according to FIG. 1 as seen from the inside.

The spot-type disc brake 2 illustrated in the drawing has a brake carrier 4 for mounting on a nonrotatable part fixed to the vehicle i.e., the steering knuckle The brake carrier 4 consists of a mounting portion 6 extending essentially parallel to a brake disc D, and having two essentially radially extending limbs 8, 10 connected with each other via a lower, radially inside connecting portion and a radially outside upper connecting portion 14. The limbs 8, 10 and the connecting portions 12, 14 form an opening 16, part of the inner connecting member 18 of the brake frame 20 extending into opening 16, inner connecting member 18 of the brake frame 20 mounting an actuation device 22 including a piston 24. The brake piston 24 protrudes with its end from a brake cylinder bore 26. In doing so, it extends—as does part of the inner connecting member 18 forming the actuation device—through the opening 16. Brake carrier arms 28, 30 essentially extending parallel to the brake disc's axis extend from the radially outside part of the upper connecting portion 14 of the brake carrier 4. The outside ends of the brake carrier arms 28, 30 are connected with each other by means of an outer connecting portion 32. As can be seen from FIG. 4, on the mounting side, the inner connecting portion 14 is axially slightly offset to the inside relative to the lower connecting portion 12. Thus, in the free space thereby provided internal supporting surfaces 34, 36 (FIG. 1) can be formed for the internal brake pad 38. Corresponding supporting surfaces 40, 42 are provided at the brake carrier arms 28, 30 in their outside areas for the external brake pad 44.

As can be seen from FIG. 4, the outer connecting portion 32 formed in one piece together with the rest of the brake carrier 4 is slightly radially offset to the inside relative to the inner connecting portion 14 and lies approximately on the level of the upper limitation of the brake piston 24. On its radially inside lying side, the outer connecting portion 32 has a point of support or rather a supporting surface 46 lying in the area of the axis of symmetry of the brake carrier 4 which coincides with the section plane 4—4 illustrated in FIG. 1. The brake frame 20 has an inner member 18 as well as two arms 48, 50 essentially extending parallel to the brake disc's axis and parallel to and straddling the brake carrier arms 28, 30 respectively, arms 48, 50 being connected on the axially outside ends by means of an outer connecting member 52. As a recess need not be provided in the connecting portion 52 for the brake cylinder bore 26, the frame 20 is very rigid The brake frame 20 is composed of two parts fastened together by means of two connecting screws 54, 55. The section plane in this arrangement lies approximately at the transition from the inner connecting member 18 to the arms 48, 50. The inner connecting member 18 has two bores 58 (only one of them to be seen) arranged symmetrically to the axis 4—4, smooth steel guide rods 60 being pressed into said bores. The guide rods 60 extend parallel to the brake disc's axis and engage bores 62 provided in the eye 72 in each of the limbs 8, 10 of the brake carrier 4 The brake carrier eyes 72 in this arrangement extend axially only in the area of the internal brake pad 38. Sufficient play is provided between the guide rods 60 and bores 62, thus elastic sleeves 64 inserted into the bores 62 forming a yielding guide for the guide rods 60 allowing limited axial tilting. In the mounting area of the guide rods 60 cast recesses 66 are provided at the brake frame 20. In said recesses 66, either end of an elastic protecting elastic sleeve 69 is fitted to processed seat surfaces The other end of the protecting sleeve 69 is fastened at an axial projection 70 of the brake carrier eye 72 containing the bore 62. Thereby the protecting elastic sleeve 69 protects the guide arrangement from dirt and damage.

Figure 3:
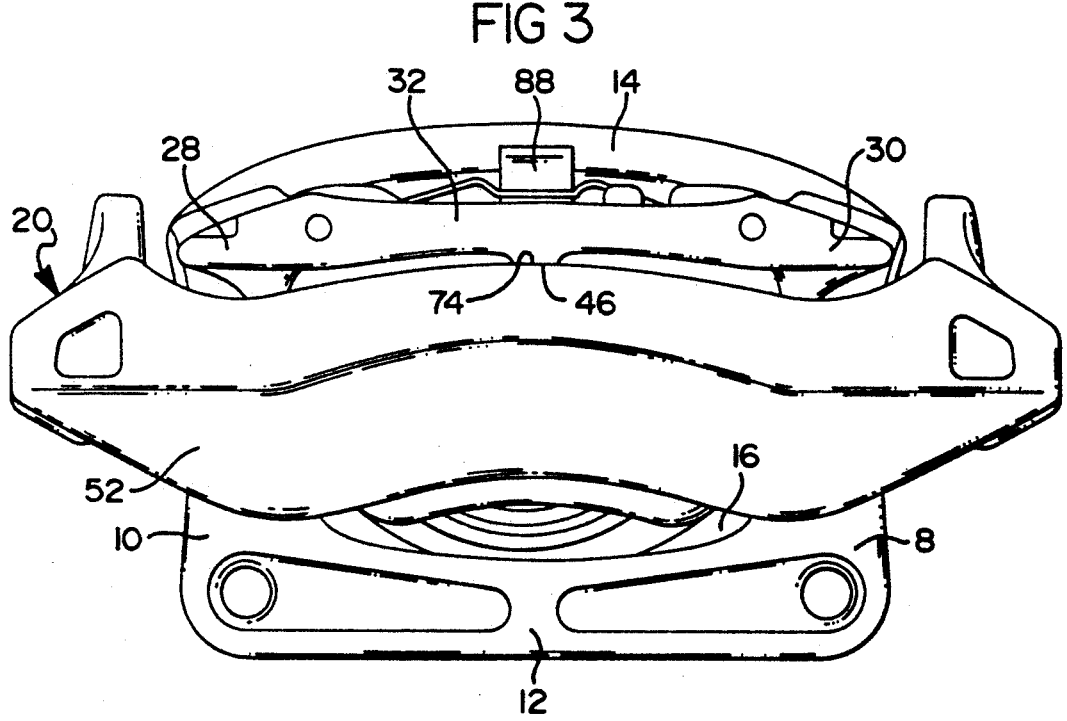
FIG. 3 is an end view of the spot-type disc brake illustrated in FIG. 1 as seen from the outside.

As is evident from FIGS. 3 and 4, the curved upper surface of the connecting member 52 of the brake frame 20 has a supporting surface 74 engaging the supporting surface 46 on the underside of the connecting portion the point of engagement aligned with the centered section line 4—4. So as to clamp the brake frame 20 relative to the brake carrier 4, a spring device 76 is provided, which in this arrangement comprises a wire spring. The wire spring 76 has a central U-shaped portion 78 resting on the radially outside upper side of the inner connecting member 18 of the brake frame 20 and extending at a small angle to the surface of support Proceeding from the central portion 78, there extend arms 80, 82 essentially proceeding parallel to the brake disc and extending at a small angle radially inside, the end portions of which are bent off parallel to the brake disc's axis and engage bores provided in the brake carrier portion 14. Due to the action of the spring 76 the brake frame 20 is pressed downwards on the inside of the axis formed by the connecting line of the elastic sleeves 64 and on the outside it is pressed upwards or radially outwards, respectively. Thus the supporting surface 74 of the outer connecting member 52 is pressed against the supporting surface 46 of the brake carrier 4.

The brake pads 38, 44 are held within the brake carrier 4 by means of pad positioning pins 83, 85. The pad positioning pins 83, 85 extend parallel to the brake disc's axis and are passed through oblong openings in the backing plates of the brake pads 38, 44. Such an opening 84 is illustrated in FIG. 1. Bores in the connecting portions 14, 32 of the brake carrier 4 serve to fasten the pad positioning pins 83, 85. Such a bore 86 is likewise to be seen in FIG. 1. a cross spring 88 is provided to clamp the brake pads 38, 44 relative to the pad positioning pins 83, 85. To this end, the cross spring 88 lies with its respective arms on the backing plates of the brake pads while arms running crosswise reach below the pad positioning pins 83, 85.

We claim:

1. A spot-type disc brake for automotive vehicles, including a brake disc rotatable about an axis, said disc brake comprising:

a brake carrier adapted to be fixed to a non rotating structure of said vehicle, said brake carrier including a pair of generally radially extending and spaced apart parallel side by side limbs, and a pair of elongated axially extending and spaced apart parallel carrier arms, each arm connected at one end to a respective one of said limbs, and connecting portion extending generally circumferentially between the other end of each of said carrier arms;

a brake frame formed by a pair of parallel side by side brake frame arms extending axially and straddling said carrier arms, an outer connecting member connecting one end of each of said brake frame arms together an inner connecting member connecting the other end of each of said brake frame arms together, thereby forming a generally rectangular frame, said outer connecting member located radially below said carrier connecting portion and extending across said carrier limbs so as to have portions each facing a portion of a respective carrier limb, an actuating device mounted in said inner connecting member of said brake frame and extending between said brake carrier limbs;

a pair of guide rods, each extending axially between said facing portion of said respective facing carrier limbs and said frame outer connecting member, and mounting means fixedly mounting one end of each of said guide rods to one of said associated portions and receiving means slidably receiving the other end of each of said guide rods in the other of said associated portions to enable axial guiding of said brake frame on said carrier, said mounting and receiving means allowing limited elastic tilting of said brake frame and carrier out of axial alignment;

an internal and external brake pad disposed between and having ends engaging said brake carrier arms, said internal brake pad adjacent said actuating device mounted in said inner brake frame connecting member, and said external brake pad axially spaced and adjacent said brake frame outer connecting member.

2. The disc brake according to claim 1, wherein said brake carrier has another connecting portion extending between said one end of each of said brake carrier arms disposed radially outward over said brake frame inner connecting member and said actuating device.

3. The disc brake according to claim 2, further including a spring element projecting axially from said brake carrier another connecting portion and engaging the top of said brake frame inner connecting member to exert a spring force tending to axially tilt said brake frame on said guide rods, said inner brake frame connecting member and said brake carrier one connecting portion each having a respective mating surface urged into engagement by the tilting force exerted by said spring element.

4. The disc brake according to claim 3, wherein said spring element comprises a wire U-form having a pair of legs received into said brake carrier inner connecting portion and a central U-portion contacting the top of said brake frame outer connecting member.

5. The disc brake according to claim 2, further including a pair of parallel, axially extending brake pad positioning pins mounted at either end of said brake carrier one and another connecting portions and circumferentially spaced apart, each of said pins passing through oblong openings in said internal and external brake pads.

6. The disc brake according to claim 5, further including a cross spring having opposite axial arms engaging respective brake pads and opposite circumferential arms hooked beneath a respective positioning pin so as to create a spring force clamping said brake pads.

7. The disc brake according to claim 1, wherein said brake frame is of two piece construction in which said inner connecting member is detachably fixed to one end of each of said brake frame arms.

8. The disc brake according to claim 1, wherein said brake carrier limbs are formed with an eyelet having an axial bore receiving one end of a respective guide rod with a clearance space therebetween, and an elastic sleeve interposed between said bore and said one end of a respective guide rod accommodating said axial tilt.

9. The disc brake according to claim 8, further including an elastic sealing sleeve mounted to each of said facing portions of said brake carrier limbs and said brake frame other connecting member enclosing a respective guide rod.

10. The disc brake according to claim 1, wherein the inside of each of said brake carrier arms have engagement surfaces each engaging an end on opposite sides of each brake pad.

* * * * *